No. 699,245. Patented May 6, 1902.
E. A. RUSSELL.
EXPANSIBLE BOLT.
(Application filed Jan. 9, 1902.)
(No Model.)
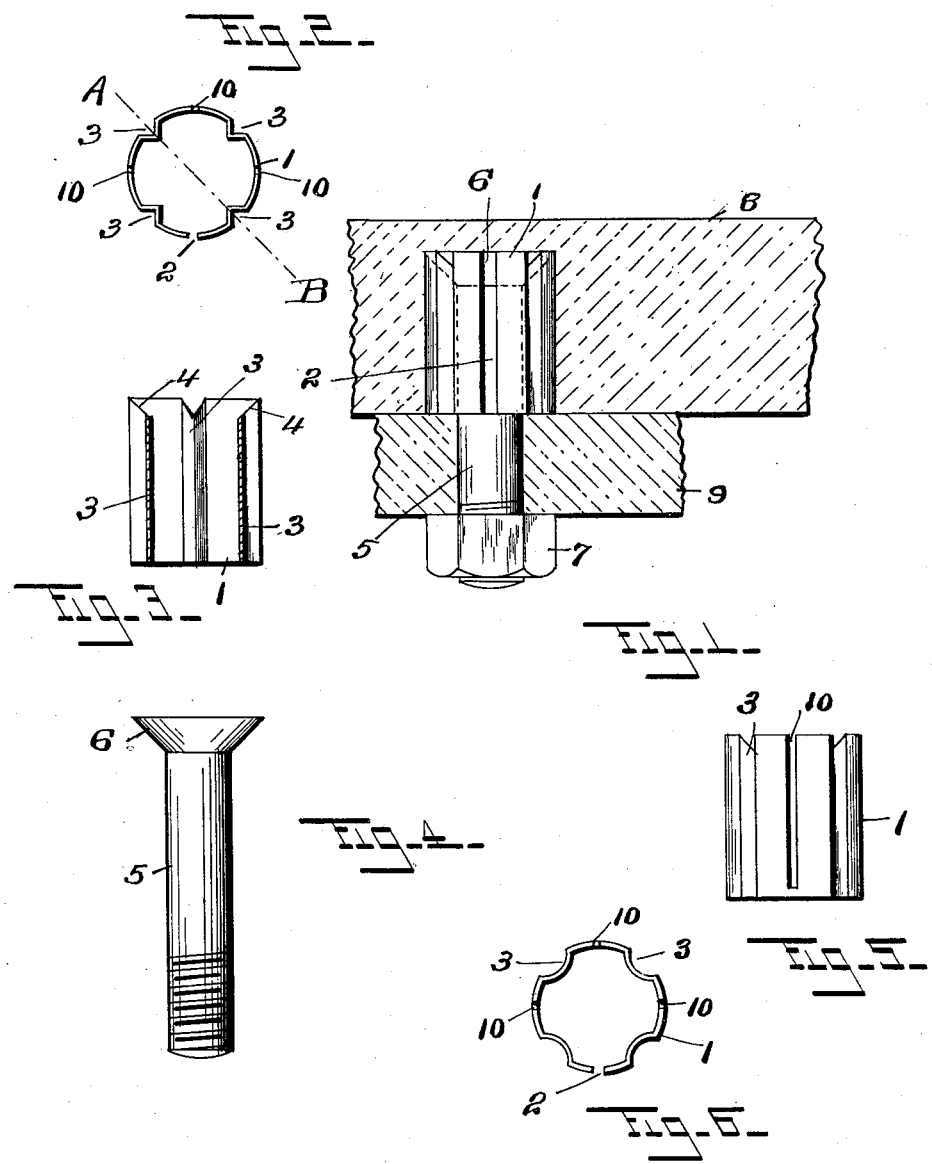
Witnesses.
William O'Brien
Charles P. Spencer
Inventor.
Edgar A. Russell
by
George E. Hall
Attorney.

UNITED STATES PATENT OFFICE.

EDGAR A. RUSSELL, OF WALLINGFORD, CONNECTICUT.

EXPANSIBLE BOLT.

SPECIFICATION forming part of Letters Patent No. 699,245, dated May 6, 1902.

Application filed January 9, 1902. Serial No. 89,025. (No model.)

*To all whom it may concern:*

Be it known that I, EDGAR A. RUSSELL, a citizen of the United States, residing at Wallingford, in the county of New Haven and State of Connecticut, have invented certain new and useful Improvements in Expansible Bolts, of which the following is a specification, reference being had therein to the accompanying drawings.

My invention relates to improvements in expansible bolts, and has for its object, among other things, the combination, with a bolt, of a flexible member that will be expanded by the movement of the bolt, which expansion shall be uniform throughout the length thereof.

To these and other ends my invention consists of an expansible bolt having certain details of construction and combination of parts, as will be hereinafter described, and more particularly pointed out in the claims.

Referring to the drawings, in which like numerals of reference designate like parts in the several figures, Figure 1 is a sectional view of a block, showing my adjustable bolt secured thereto. Fig. 2 is a plan view of the collar. Fig. 3 is a sectional view thereof upon line A B of Fig. 2. Fig. 4 is an elevation of the bolt. Fig. 5 is an elevation of the collar, and Fig. 6 is a plan view of a modified form of collar.

My device, without being limited thereto, is especially designed to be used with slabs or blocks of stone—such as marble, &c.—in which the bolt-hole is bored from one side and does not pass entirely through the stone. In practice these holes vary greatly in diameter, and the present manner of securing the bolt within these holes by means of solder, lead, &c., is unsatisfactory and quite costly, aside from the fact that they are permanently fixed and not removable.

My invention provides a removable bolt which can be used for work of this character and is adapted to fit holes of varying diameters with a perfect unyielding grip without the use of solder or other materials.

Referring to the drawings, the numeral 1 designates the collar, which is preferably formed of sheet metal, having a plurality of longitudinal corrugations 3 therein, the top edges of which are beveled inwardly to form the inclined faces 4. This collar is slotted between each of the corrugations, one of the slots (designated 2) extending the whole of the collar, while the slots 10 are open length at one end and terminate adjacent to the other end. The bolt 5 is provided with a tapered head 6 at one end, the angle thereof being substantially the same as that of the faces 4, and is threaded upon its opposite end for the nut 7. When the bolt 5 is surrounded by the collar 1, the conical head 6 thereof will rest upon the inclined faces 4 of the corrugations 3. I prefer to bevel the edges of the corrugations, as shown by the faces 4; yet so far as my invention is concerned it may be left square, as shown by the bottom edges of the said corrugations.

In Fig. 1 my invention is illustrated as applied to a block 8, and fastened thereto by means thereof is a plate 9. The collar 1, with the bolt therethrough, is inserted within the bore in the block 8, and the plate 9 is then placed in position, with the shank of the bolt 5 passing therethrough. The nut 7 is now threaded upon the bolt, and by its contact with the under side of the plate 9 the bolt is drawn through the collar 1, and the engagement of the inclined face of the head 6 with the inclined faces 4 of the corrugations 3 causes the collar 1 to expand until it impinges against the walls of the hole, when it will take a firm, inseparable, and unyielding grip thereon until the nut 7 is tightened as much as possible, when all of the parts will be secured rigidly together.

The shape or form of the corrugations 3 can be varied indefinitely, and therefore is not material to my invention, and one of the many modifications is shown in Fig. 6, in which the corrugations are semicircular instead of angular.

There are other minor changes and alterations that can be made within my invention aside from those herein shown, and I would therefore have it understood that I do not limit myself to the exact construction herein shown and described, but claim all that falls fairly within the spirit and scope of my invention.

What I claim as new, and desire to secure by Letters Patent, is—

1. In an expansible bolt, the combination with a longitudinally corrugated and split collar; of a bolt adapted to pass therethrough, and by its engagement therewith to expand said collar.

2. In an expansible bolt, the combination with a split collar having longitudinal corrugations therein; of a bolt adapted to pass therethrough and having a tapered head thereon which engages said collar.

3. In an adjustable bolt, the combination with a collar member slotted longitudinally and having a plurality of longitudinal corrugations therein, said corrugations having inclined faces at one end thereof; of a bolt having a tapered head thereon which engages the inclined faces of the said corrugations.

4. In an adjustable bolt, the combination with a longitudinally-slotted collar member having a plurality of inwardly-projecting corrugations therein, said corrugations having inclined faces upon one end; and a bolt having a tapered head, the angle of which corresponds to the inclined faces of the said corrugations.

5. In an adjustable bolt, the combination with a longitudinally-slotted collar member 1 having a plurality of corrugations 3 therein, one end of said corrugations having inclined faces 4; and a bolt 5 adapted to pass through said collar member and having a tapered head 6 thereon which engages the inclined faces 4.

6. In an adjustable bolt, the combination with a corrugated collar having a slot extending throughout the length thereof and a plurality of slots extending from one end and terminating adjacent to the other end thereof, all of said slots being between the said corrugations; of a bolt adapted to be surrounded by said collar and by its engagement therewith to expand the same.

7. In an adjustable bolt, the combination with a longitudinally-corrugated collar having a slot extending throughout the length thereof and a plurality of slots extending from one end and terminating adjacent to the other end thereof; of a bolt adapted to be surrounded by said collar and by its engagement therewith to expand the same.

8. In an adjustable bolt, the combination with a longitudinally-corrugated collar having a slot extending throughout the length thereof and a plurality of slots between said corrugations extending from one end and terminating adjacent to the other end thereof; of a bolt adapted to be surrounded by said collar and by its engagement therewith to expand the same.

9. In an adjustable bolt, the combination with a collar member 1 having a plurality of corrugations 3 therein, one end of said corrugations having inclined faces 4; and a slot 2 extending throughout the length of said collar and slots 10 open at one end and terminating adjacent to the other end thereof; and a bolt 5 adapted to pass through said collar member and having a tapered head 6 thereon which engages the inclined faces 4.

In testimony whereof I affix my signature in presence of two witnesses.

EDGAR A. RUSSELL.

Witnesses:
GEORGE E. HALL,
J. PETER DEJAN.